United States Patent [19]

Koel et al.

[11] 4,239,587

[45] Dec. 16, 1980

[54] METHOD OF MANUFACTURING A THIN-FILM MAGNETIC HEAD WITH A NICKEL-IRON PATTERN HAVING INCLINED EDGES

[75] Inventors: Gerrit J. Koel; Lambertus Postma, both of Eindhoven, Netherlands

[73] Assignee: U.S. Philips Corporation, New York, N.Y.

[21] Appl. No.: 934,685

[22] Filed: Aug. 18, 1978

[30] Foreign Application Priority Data

Aug. 29, 1977 [NL] Netherlands .......................... 7709481

[51] Int. Cl.³ .............................................. C23F 1/02
[52] U.S. Cl. ................................ 156/659.1; 204/35 R; 204/38 R; 204/40; 204/43 T; 156/628; 156/656; 430/318; 252/79.3; 360/122; 360/127

[58] Field of Search ............... 360/127, 110, 126, 125, 360/122, 123; 252/79.3; 156/628, 656, 659, 664; 427/130, 131; 204/14 R, 14 N, 20, 23, 35 R; 29/602 R, 603; 428/900

[56] References Cited

U.S. PATENT DOCUMENTS

| | | | |
|---|---|---|---|
| 3,808,070 | 4/1974 | Jordan | 156/656 |
| 3,892,606 | 7/1975 | Chappelow et al. | 357/54 X |

*Primary Examiner*—William A. Powell
*Attorney, Agent, or Firm*—Robert S. Smith

[57] ABSTRACT

In the electrodeposition of nickel-iron alloy layers during the manufacture of a thin-film magnetic head it is ensured that the nickel-iron alloy layer has a top layer having a higher iron content than the iron content of the remainder of the nickel-iron alloy layer. Since this top layer etches more rapidly than the remainder of the layer, the nickel-iron alloy layer itself becomes sloped during etching, this sloping configuration presents great advantages in the subsequent coating with a layer of silicon dioxide.

3 Claims, 5 Drawing Figures

METHOD OF MANUFACTURING A THIN-FILM MAGNETIC HEAD WITH A NICKEL-IRON PATTERN HAVING INCLINED EDGES

The invention relates to a method of manufacturing a thin-film magnetic head, including the step of forming a layer of a nickel-iron alloy on a substrate, forming a photoresist pattern over the nickel-iron alloy layer, and chemically etching the nickel-iron alloy so as to form a pattern having sloping slides.

A magnetizable nickel-iron alloy is to be understood to mean herein an alloy on the basis of 35-902 nickel which, if desired, may contain additions of small percentages of other metals, for example, chromium, molybdenum, manganese, copper, see "The Proceedings of the Physical Society," Section B, Vol. 66, pp. 221-239.

In the manufacture of thin-film magnetic heads, in which an insulating layer is sputtered onto a nickel-iron layer present on a substrate and in which nickel-iron layer a pattern has been etched, the insulating layer follows the contours of the nickel-iron pattern, that is to say: the insulating layer will show bosses at the area of the nickel-iron pattern.

However, it is difficult to cause the insulating layer to follow the relief of the underlying surface in such manner that the thickness of the insulating layer is the same everywhere. This applies notably to the upright edges of the nickel-iron pattern, where the insulating layer generally is considerably thinner than the insulating layer over the flat areas. In order to give the edges a sufficiently thick insulating coating over the edges it is necessary to make the thickness of the insulating layer over the flat areas of the pattern much larger than is actually necessary; for example, depending on the height of the nickel-iron pattern it is usual to make the insulating layer in the flat areas one and a half times as thick as the nickel-iron pattern in the flat areas.

It is therefore desirable in practice for a nickel-iron pattern to have inclined edges at least locally so that insulation material and/or electrical turns which are to be provided on the pattern do not show any discontinuities when they are provided as a thin layer.

A method of forming a pattern having inclined edges in a sputtered nickel-iron layer is known which uses an auxiliary layer between the nickel-iron layer to be etched and the layer of photo-resist, said auxiliary layer having an etching rate which exceeds that of the nickel-iron layer. Undercutting of the auxiliary layer below the photoresist layer occurs and the layer to be etched becomes accessible over a wider region so that inclined edges can be formed.

A disadvantage of this method upon etching electroplated nickel-iron layers is that the etching rate of the auxiliary layer must be higher but may not be much higher than that of the layer to be etched, as occurs when the auxiliary layer and the layer to be etched are more or less conductive and can form a galvanic element so that the auxiliary layer often dissolves far too rapidly. As a result of this, auxiliary layers of suitable composition are hard to find and which can be applied in such circumstances that the magnetic properties of the electroplated nickel-iron layer do not deteriorate considerably. Another disadvantage is that, if a suitable material for an auxiliary layer can be found, the provision of said auxiliary layer has to take place in a second bath, which makes the method more complicated.

One of the objects of the invention is to at least considerably mitigate the above-mentioned disadvantages.

The invention provides a method which is characterized in that a top thickness of the nickel-iron alloy layer remote from the substrate has a higher iron contact than the iron content of the remainder of the nickel-iron alloy layer. (The thickness of the top layer is, for example, less than 0.1 $\mu$m, while the thickness of the original nickel-iron layer may be a multiple thereof, for example, may be approximately 3 $\mu$m).

The invention is based on the fact that:

a the etching rate of a nickel-iron layer increases with increasing iron content, and that b starting from a fixed composition of an electroplating bath the iron content in a nickel-iron layer deposited therefrom increases when the current density is decreased.

So during the last phase of the deposition of the nickel-iron layer in an electroplating bath, the voltage of the bath may advantageously be reduced so as to obtain a nickel-iron layer having a faster-etching top layer which during etching ensures the formation of inclined slopes.

The relation holds that $$\sin \alpha = \frac{\text{etching rate nickel-iron layer}}{\text{etching rate top layer}}$$

where $\alpha$ is the desired angle of inclination between the edge of the nickel-iron pattern and the subjacent substrate surface.

By varying the iron content of the top layer, the angle of inclination produced on the etched patterns of electroplated nickel-iron layers can be adjusted so as to be reproducible within wide limits. For example, the etching rate of a nickel-iron layer containing 57% iron by weight is twice as high as the etching rate of a nickel-iron layer containing 21.5% by weight iron.

The method according to the invention may be used advantageously in particular in those cases wherein a subsequent stage only a thin insulating layer may be provided on the nickel-iron pattern, for example, the transmission gap in a thin-film magnetic head.

However, the use of the method according to the invention may present great advantages in other cases also. As a matter of fact it has been found that even in structures where the provision of a thick insulating layer over a nickel-iron pattern may be permitted, a steep slope of the edge of the nickel-iron pattern involves a significant disadvantage when an interconnection hole has to be formed through an insulating layer provided on the nickel-iron pattern, in order that in a later stage of the manufacture a second nickel-iron layer can be connected to the (first) nickel-iron layer. When a hole is etched in the usual manner, chemically, in an insulating layer provided over a nickel-iron pattern, the hole will reach the edge of the pattern, and possibly even the lower side thereof, before all the insulating material above the pattern has been removed. During the time that the remainder of the insulating material above the pattern at the area of the hole is removed, an undesired attach by the etchant along the side of the pattern will take place as a result of which an undesired slot is formed which means a weak spot in the structure. Said "gap corrosion" is obviously due to a preferential etching phenomenon along the edge of the nickel-iron pattern.

Within the scope of the invention it is now possible to make such interconnection holes without problems in that by providing a top layer which contains more iron—and hence can be etched more rapidly—a nickel-iron pattern having inclined edges is obtained during etching.

The inclined edges formed on the nickel-iron pattern have the advantage that during the subsequent etching of the interconnection holes the insulating material is etched away uniformly so that no gap corrosion occurs. This method permits in particular the etching of interconnection holes which are at least as wide as the underlying part of the nickel-iron pattern.

The invention also relates to a magnetic head manufactured by using the above-described method and to a thin-film magnetic head having a layer of a magnetizable nickel-iron alloy projecting above the surface of the substrate and in which a pattern is etched and across which an electrically insulating layer is provided, the pattern having edges having slopes which are inclined with respect to the substrate surface, which magnetic head is characterized in that the layer of nickel-iron has a top layer with a higher iron content than the iron content of the remainder of the nickel-iron layer. The angle of inclination is preferably 30° to 50°. With angles of inclination which are smaller than approximately 30° the cross-section of the nickel-iron pattern becomes too small. With angles of inclination exceeding approximately 50° the transition from the substrate to the nickel-iron pattern is no longer sufficiently uniform ("the slope becomes too steep") so that problems will arise during the deposition of the insulating layer.

An embodiment of the invention will now be described with reference to the accompanying drawing, in which.

Figure 1:
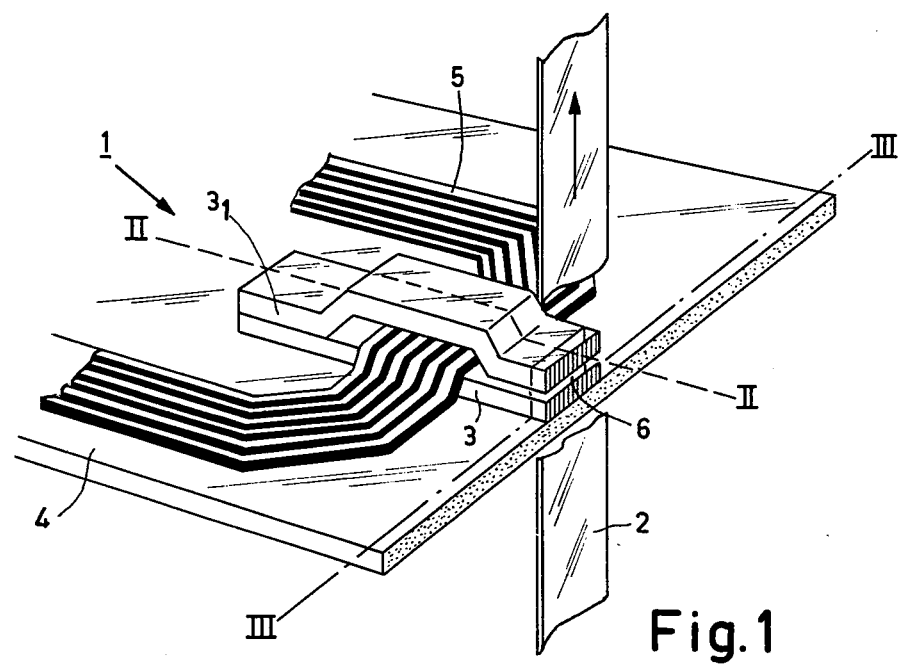
FIG. 1 is a schematic perspective view of part of a magnetic head manufactured by means of the method according to the invention.

FIG. 1 shows a thin-film magnetic head 1 of the so-called vertical type which is destined for co-operation with a magnetizable recording medium 2. 3 and 3' denote two layers of nickel-iron provided on a substrate 4 which together constitute a magnet core. Although one magnet core is shown, a large number of such magnet cores may be provided on the substrate 4. At the area where the layers 3 and 3' are connected together, they are surrounded by a (flat) turn 5 of electrically conductive material insulated from the magnet core. The part which is brought in flux coupling with the recording medium 2 is provided with a gap 6.

In the method according to the invention of manufacturing the above-described magnetic head, a pattern in the form of the above-described core part 3 is provided in a layer of a magnetizable nickel-iron alloy by means of a photoetching process. How this is effected will be explained with reference to FIGS. 2, 3, 4 and 5.

Figure 2:
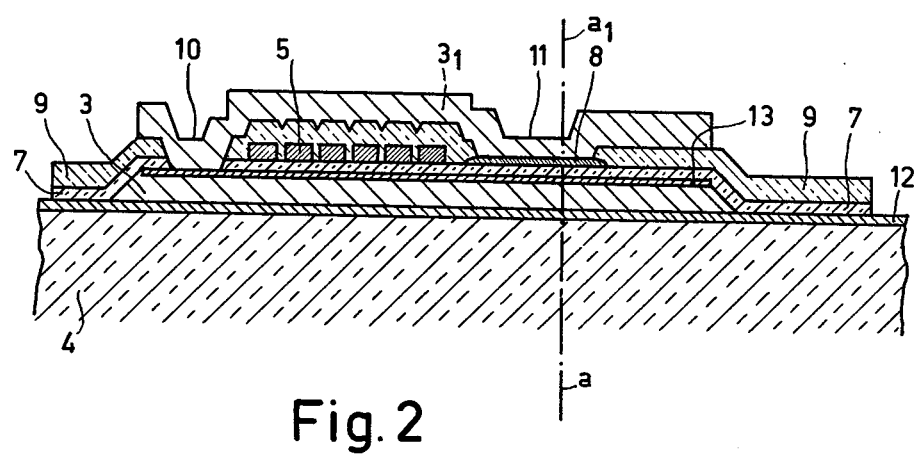
FIG. 2 is a schematic sectional view taken on the line II—II of the magnetic head shown in FIG. 1, and FIGS. 3, 4 and 5 show, with reference to a detail, different stages during the carrying out of the method according to the invention.

FIG. 2 is a sectional view of the magnetic head shown in FIG. 1 taken on the line II—II during a given stage of the manufacturing process, shown on a larger scale and in greater detail than in FIG. 1.

A starting material in the manufacture of the magnetic heads is a polished silicon substrate 4 of semiconductor quality having a cross-section of approximately 4 cm and a thickness of 250 μm. By thermal oxidation of the substrate, a 5000 Å thick passivating silicon oxide layer (not shown) is formed on the substrate 4. Hereon a 50 Å thick TiO$_2$ layer 12 is sputtered. A layer 3 of nickel-iron is deposited hereon by electroplating. For this purpose the substrate 4 is dipped in an electroplating bath containing per liter:

130 g NiSO$_4$.6H$_2$O
28.3 g Fe(NH$_4$)$_2$(SO$_4$)$_2$.6H$_2$O
40 g H$_3$BO$_3$
30 g sacharin.

The electrodeposition process is carried out at a temperature slightly above room temperature and with a current density of 50 mA/sq.cm, which provides a rate of deposition of approximately 1 μm per minute. The current density is reduced to 10 mA/sq.cm when the layer 3 has a thickness of 3 to 4 μm. In approximately 30 seconds a top layer 13 is deposited in a thickness of 1000 Å. As a result of this the layer 13 has a higher Fe content (57% by weight) than the layer 12 which contains 21.1% by weight Fe.

A layer of photolacquer (not shown) is provided in a pattern which corresponds to the pattern desired in the nickel-iron layer over the top layer 13. The top layer 13 and the layer 3 are then etched simultaneously in a suitable etching bath. The etching bath may consist, for example, of an aqueous solution of sulphuric acid, hydrogen fluoride and hydrogen peroxide, as described in United Kingdom Patent Specification No. 1,487,234.

The etching rate of nickel-iron depends on the iron content. It has been found that a layer of nickel-iron having 21.5% iron has an etching rate of 0.28 μm/min; a layer containing 35% iron has an etching rate of 0.41 μm/min and a layer having 57% of iron has an etching rate of 0.6 μm/min. In the present case the top layer 13 is thus etched twice as rapidly as the layer 3. As a result of this the layer 3 obtains inclined edges having in this case an angle of inclination of approximately 30°. After etching, the layer of photolacquer is removed by means of acetone. Variations in thickness of the layer 13 have in principle no influence on the value of the angle of inclination.

Figure 3:
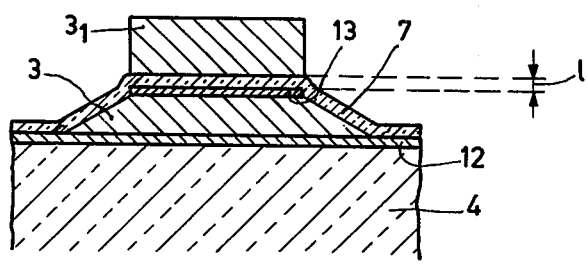
Figure 4:
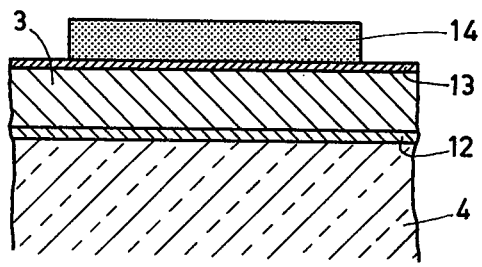
Figure 5:
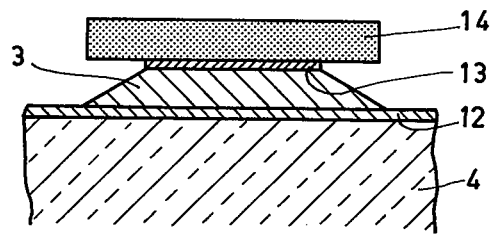

All this will be shown in greater detail in FIGS. 3, 4 and 5.

FIG. 3 shows a sectional view on a larger scale and in greater detail taken on the line III—III of the magnetic head 1 shown in FIG. 1. As shown in FIG. 3, the layer 3 must have inclined edges so as to make it possible to deposit a thin layer of non-magnetic material 7 which determines the length l of the gap 6 in such manner that the nickel-iron pattern is sufficiently covered. The gap length l is, for example, 1 μm.

FIGS. 4 and 5 are also sectional views of the magnetic head shown in FIG. 1 taken on the line III—III but during stages in the manufacture preceding the situation shown in FIG. 3.

FIG. 4 shows a layer 3 of nickel-iron with a faster-etching top layer 13 bearing photolacquer layer 14.

FIG. 5 shows how after etching the layer 3 has inclined slopes having an angle of inclination of approximately 30°.

Referring to FIG. 2, the completion of the magnetic head shown in FIG. 1 will now be described.

After etching the layer 3 in the desired pattern, a thin layer of silicon dioxide 7 is sputtered (thickness approximately 1 μm) onto the layer 13, the slopes of the layers and the exposed areas of the layer 12. A pattern of a flat coil having six turns is formed by sputter etching a sandwich consisting of 500 Å Mo, 2000 Å Au and 1000 Å Mo which had been sputtered onto the layer 7, and then electrodepositing a 2 μm thick copper layer on said pattern.

A layer 9 of silicon dioxide is then sputtered over the turns 5 and the layer 7. Interconnection holes 10 and 11 are etched in the layer 7 by means of an etchant consisting of an aqueous solution of hydrogen fluoride and ammonium fluoride. In order to ensure that during the etching of the interconnection holes the correct quantity of silicon dioxide remains to define the gap length, an etchant stop 8 in the form of a layer of Mo of 1000 Å thickness is deposited on the layer 7 before the layer 9 is deposited.

A layer of nickel iron 3' is then deposited over the layer 9. Finally, in order to make the head ready for use, the part on the right hand side of the line a—a' in FIG. 2 is removed by means of a polishing treatment.

The invention is not restricted to the above examples. In practice many variations are possible to those skilled in the art without departing from the scope of this invention.

What is claimed is

1. A method of manufacturing a thin-film magnetic head, the method including the steps of forming a layer of a nickel-iron alloy on a substrate, forming a photoresist pattern over the nickel-iron alloy layer, and chemically etching the nickel-iron layer so as to form a pattern having sloping sides, wherein a top thickness of the nickel-iron layer remote from the substrate has a higher iron content than the iron content of the remainder of the nickel-iron alloy layer.

2. A method as claimed in claim 1, characterized in that the nickel-iron layer is deposited on the substrate in an electroplating bath, a top layer having a higher iron content than the iron content of the remainder of the nickel-iron alloy layer being formed by reducing the voltage applied in the electroplating bath during the last phase of the deposition process.

3. A method as claimed in claim 1 or claim 2, characterized in that the nickel-iron layer is etched in an etching bath comprising a strong acid, hydrogen peroxide and hydrogen fluoride.

* * * * *